United States Patent
Gasquet et al.

(10) Patent No.: US 6,402,437 B1
(45) Date of Patent: Jun. 11, 2002

(54) PROCESS FOR CONVEYANCE OF POWDER MATERIALS IN HYPERDENSE PHASE APPLICABLE TO BYPASSING OBSTACLES

(75) Inventors: Gerard Gasquet, Les Pennes Mirabeau; Christian Cloue, Gardanne; Stephane Torsiello, Aix en Provence, all of (FR)

(73) Assignee: Aluminium Pechiney, Paris (FR)

( * ) Notice: Subject to any disclaimer, the term of this patent is extended or adjusted under 35 U.S.C. 154(b) by 0 days.

(21) Appl. No.: 09/674,493
(22) PCT Filed: Jun. 1, 1999
(86) PCT No.: PCT/FR99/01275
§ 371 (c)(1), (2), (4) Date: Jan. 29, 2001
(87) PCT Pub. No.: WO99/62800
PCT Pub. Date: Dec. 9, 1999

(30) Foreign Application Priority Data

Jun. 2, 1998 (FR) .............................. 98 07120

(51) Int. Cl.[7] .............................................. B65G 51/00
(52) U.S. Cl. .......................... 406/198; 406/14; 406/19; 406/197
(58) Field of Search ............................ 406/14, 19, 197, 406/198

(56) References Cited

U.S. PATENT DOCUMENTS 3,024,071 A  3/1962  Morrow 5,299,694 A  4/1994  Rambaud

FOREIGN PATENT DOCUMENTS

DE  3407402  8/1985

*Primary Examiner*—Christopher P. Ellis
*Assistant Examiner*—Joe Dillon, Jr.
(74) *Attorney, Agent, or Firm*—Dennison, Scheiner & Schultz

(57) ABSTRACT

Process for conveyance of a powder material in a hyperdense bed to bypass an obstacle, in which an obstacle bypass device including at least upstream, intermediate and downstream caissons is inserted between two horizontal conveyors, an upstream conveyor, and the downstream conveyor. At a device entry, at the upstream caisson lower duct is supplied with gas at pressure P1, the upstream caisson further including an upper duct which is a column. The intermediate caisson is between the upstream caisson and the downstream caisson at a level that bypasses the obstacle, a lower duct of which is fed with gas at pressure P3 and an upper duct of which is connected to the upper duct of the upstream caisson and to an upper duct of the downstream caisson. At a device outlet, at the downstream caisson, a lower duct is supplied with gas at pressure P2. The three caissons remain full of powder material kept in a potential fluidization state at all times, with a pressure difference P1–P2 being kept strictly positive.

11 Claims, 3 Drawing Sheets

PROCESS FOR CONVEYANCE OF POWDER MATERIALS IN HYPERDENSE PHASE APPLICABLE TO BYPASSING OBSTACLES

BACKGROUND OF THE INVENTION

The invention relates to an improvement to the powder material conveyance and distribution system in hyperdense phase. This improvement makes it possible to equip existing industrial installations with this high performance and economic conveyance system.

It is a continuous process for conveyance of a powder product in order to feed a large number of packaging assemblies such as bagging machines, containerization devices, or a large number of production assemblies such as plastic extruding presses or igneous electrolysis vat cells, from a single storage area.

Powder materials to be conveyed can be fluidized; their size grading and cohesion are such that injecting gas into them at low velocity can eliminate cohesion between particles and reduce internal friction forces. For example, this type of material includes alumina for igneous electrolysis, cements, plasters, quick lime or slaked lime, fly ash, calcium fluoride, magnesium chloride, all types of fillers for mixes, catalysts, coal dust, sodium sulfate, phosphates, polyphosphates or pyrophosphates, plastics in powder form, food products such as powder milk flour, etc.

DESCRIPTION OF THE RELATED ART

Many devices have been studied and developed for conveyance of powder materials in fluidized bed. One particular problem is related to the continuous feed of the powder material regulated as a function of consumption requirements of the said material. One of the many examples illustrating this problem is feed of alumina to igneous electrolysis cells for the production of aluminum.

In order to do this, the alumina, which is a powder product conveyed and solubilized in the electrolytic bath, is consumed gradually while electrolysis is taking place, and must be replaced as it is consumed so that the concentration of solubilized alumina remains optimum, encouraging maximum efficiency of the electrolysis cell. It then becomes necessary to adjust the quantity of alumina added into the electrolysis vat, so that its operation is not disturbed by excess or insufficient alumina.

The powder materials conveyance device developed by the applicant and described in European patents EP-B-0 122 925, EP-B-0 179 055, EP-B-0 187 730, EP-B-0 190 082 and EP-B-0 493 279 enables continuous feed of powder solids in their hyperdense phase. It is used particularly for regular and continuous feed to storage and distribution hoppers located in the superstructure of electrolytic pots.

This device comprises at least one horizontal conveyor called the air-pipe between the storage area and the area to be supplied, composed of a lower duct in which gas circulates, and an upper duct in which the powder material is conveyed, the two channels being separated by a porous wall. Gas is blown into the lower duct through at least one supply tube. The powder material completely fills the upper duct of the conveyor and this conveyor is fitted with at least one balancing column partially filled with powder material, the filling height balancing the gas pressure. This balancing column creates the conditions for potential fluidization of the powder material. The powder material, which is not disturbed very much due to the very low gas flow, is present in the air pipe in the form of a hyperdense bed.

In order to make the description of potential fluidization easier to understand, it is worth while repeating the principles of conventional fluidization, normally used for conveying powder materials and described for example in patent U.S. Pat. No. 4,016,053. The device used in fluidization also comprises an air pipe as described above. The fluidization gas is injected into the lower duct at a given pressure $p_f$, passes through the said porous wall and then passes between the particles at rest in the powder material forming the layer to be fluidized. Unlike the potential fluidization device, the thickness of this layer at rest is very much less than the height of the upper duct of the said conveyor, in other words in the absence of any injection of fluidization gas, the powder material only very partially fills the upper duct of the horizontal conveyor.

In conventional fluidization, by imposing a high gas flow, the said particles are moved and lifted, each of them losing its permanent contact points with its neighbors. In this way the interstitial space between the particles increases, internal friction between particles is reduced and these particles are put into a state of dynamic suspension. Consequently, the result is an increase in the initial volume of the powder material and a corresponding reduction in the apparent density.

The term "dense phase" is usually reserved for pneumatic transport at high pressure. The hyperdense phase is characteristic of potential fluidization. To give an idea of the situation, consider the example of the case of alumina $Al_2O_3$ in which the solid/gas ratio is of the order of 10 to 150 kg $Al_2O_3$/kg of air in dense phase pneumatic transport and is 750 to 950 kg $Al_2O_3$/kg of air for conveyance by potential fluidization in the hyperdense phase. Therefore, the solid powder can be conveyed at very high solid gas concentrations in the hyperdense phase, significantly higher than the dense phase in pneumatic transport.

In the case of potential fluidization, even if no gas is injected, the powder material almost completely fills the conveyance device and particularly the upper duct. When gas is injected into the lower duct, the balancing column is partially filled with powder material occupying the upper duct at a manometric head that balances the pressure $p_f$ and prevents the size of the interstices between the particles from increasing. Consequently, the presence of the balancing column prevents fluidization of the powder material present in the horizontal conveyor and forces the said material to appear as a hyperdense potential fluidization bed. Furthermore, since the interstitial distance between particles does not increase, the permeability of the medium to gas injected at pressure $p_f$ is very low and limits the gas flow to a very small quantity. We will subsequently refer to this low gas flow that passes through the balancing column "degassing".

Therefore, no fluidization takes place, but it is possible to talk about potential fluidization; there is no permanent circulation of material in the air pipe, but flow will take place by successive collapsing as soon as the need for any powder material arises, for example when the level of the area to be supplied drops below a critical value. When continuous consumption of the material stored in the area to be supplied is such that the material level drops below the level of the orifice in the supply pipe, a certain quantity of powder material will escape from the pipe creating a "vacuum" which will be filled by falling material, which will create a domino effect and thus continue throughout the air pipe working backwards towards the storage silo.

The potential fluidization device for conveyance in a hyperdense bed, as described in European patents EP-B-0

122 925, EP-B-0 179 055, EP-B-0 187 730, EP-B-0 190 082 and EP-B-0 493 279, is used on a large scale particularly to supply 300000 ampere vats in recent installations designed for igneous electrolysis of aluminum. The advantages of this device are well known:

continuous feed to vats in order to keep the hoppers full at all times, low system maintenance, low wear due to the low product circulation velocity, no size grading segregation, low energy consumption, perfect control over transport of the alumina, with no preferential blow off.

In an electrolysis workshop, the number of areas to be supplied from a single storage area may be high (several tens) and the distance between the storage area and the area to be supplied may be high (several hundreds of meters). The device illustrated in EP-B-0 179 055 is composed of a series of conveyors in cascade; a primary conveyor between the storage area and a series of secondary conveyors, each assigned to a pot and equipped with side take-off points that feed hoppers integrated into the vat superstructure.

But this system imposes the use of horizontal or slightly inclined conveyors, so that the sequence of small collapses (that occur progressively in the air pipe as far as the storage silo) can occur under optimum conditions. The applicant observed firstly that it is impossible to keep the material in a state of potential fluidization if the conveyor is inclined at a steep slope and secondly that a sudden change in the slope interrupts the "domino" effect of small collapses and causes the formation of solid plugs in which the powder material can no longer be kept in the potential fluidization state.

However, an old workshop was not necessarily designed to be fed only by horizontal or slightly inclined conveyors. There are sometimes passageways inclined conveyors. There are sometimes passageways reserved for electrolysis service vehicles (liquid bath transport, metal transport, etc.) and obstacles that conveyors cannot bypass to the left or to the right, and where a level change is unavoidable.

Consequently, the applicant attempted to develop a process that would make it possible to use the hyperdense phase conveyance system described in European patents EP-B-0 122 925, EP-B-0 179 055, EP-B-0 187 730, EP-B-0 190 082 and EP-B-0 493 279, even for the purposes of renovating equipment in old installations.

SUMMARY OF THE INVENTION

The process according to the invention is a process for conveyance of powder materials by potential fluidization capable of bypassing obstacles by changing levels, in other words releasing the hyperdense bed conveyance system from the constraint of using only horizontal or slightly inclined conveyors. These conveyors are qualified as "horizontal" in the rest of this description, even if they are slightly inclined, for simplification purposes.

According to the invention, a device to bypass an obstacle comprising at least three caissons is inserted into the hyperdense bed conveyor system adjacent to the obstacle to be bypassed between two horizontal conveyors (one will be called the "upstream" conveyor and the other the "downstream" conveyor):

at the entry to the device, an upstream caisson comprising a lower duct containing gas fed at pressure $P1$ and an upper duct or pipe composed essentially of a column connected at one end to the upper duct of the upstream conveyor and at the other end to the upper duct in the intermediate caisson;

in the middle, at a level that goes above the obstacle, at least one intermediate caisson comparable to a horizontal air pipe, the lower duct of which is fed with gas at pressure $P3$ and the upper duct of which is connected through its first end to the upper duct of the upstream caisson, is connected at its second end to the upper duct of the downstream caisson;

at the outlet from the device, a downstream caisson comprising a lower duct supplied with gas at pressure $P2$ and an upper duct or pipe composed essentially of a column connected firstly to the upper duct of the intermediate caisson and secondly to the upper duct of the downstream conveyor.

The obstacle is at the same level as at least one of the horizontal conveyors and the intermediate caisson is not at the same level as the obstacle, so that it can bypass it. The horizontal conveyors are usually at the same level, but there is no reason why there should not be a difference in height between these two horizontal conveyors. The intermediate caisson is long enough to get past the obstacle to the powder material to be conveyed.

The particular feature of the device is that it creates a pressure difference $\Delta P=P1-P2$ which is always strictly positive, the pressure difference being such that the three caissons remain full of powder material kept in a potential fluidization state at all times. By making sure that this pressure difference remains positive, the device acts like a hydraulic siphon; note that the product flow takes place freely, continuously and regularly from the first horizontal conveyor to the second.

Preferably, the columns on the upstream caisson and the downstream caisson are balancing columns full of powder product at a height such that the free level of the said material in each of these columns is at or above the highest point in the air pipes belonging to the group consisting of the intermediate caisson and the parts of the upstream and downstream conveyors located close to their junctions with the bypass device. Since the pressure difference $\Delta P=P1-P2$ is always positive and is guaranteed when the height of the powder material in the column of the upstream caisson is greater than the height of the powder material in the column of the downstream caisson.

In practice, the device according to the invention applied to the conveyance of alumina preferably uses an intermediate caisson located at a lower level than the two horizontal conveyors, so that alumina can go under the floor of the vats to leave free passage for electrolysis service vehicles. But a passage above or at an intermediate level would also be possible. The essential point is firstly to make sure that the free alumina level in the two columns is at the highest point of the two conveyors and the intermediate caisson, and secondly that the alumina height in the first column is greater than the alumina height in the second column.

The pressure in the intermediate caisson is used to put the powder material into a potential fluidization state. Preferably, its value is intermediate between the potential fluidization pressure of the first column and the potential fluidization pressure of the second column.

If the system is to operate correctly, it is useful to form a space without any powder material in the high part of the intermediate caisson upper duct, forming a pressurized gas bubble. The applicant has observed that in general, the presence of gas bubbles in the high part of upper ducts in hyperdense phase conveyors improves potential fluidization conditions and enables better circulation of the fluidization gas. The French patent application FR 9806124 deposited by the applicant on May 11, 1998 describes devices adapted to the creation of bubbles stable in the high part of the upper ducts of conveyors. In fact, it is sufficient to extend each column by a penetration on each side of the high part of the intermediate caisson upper duct. The height of the penetration is preferably between one half and one hundredth of the height of the useful part of the air pipe conveying the powder material.

BRIEF DESCRIPTION OF THE DRAWINGS

The process according to the invention will be better understood after reading the detailed description of the various devices described below using non-limitative examples.

DESCRIPTION OF THE PREFERRED EMBODIMENTS

EXAMPLE 1

Figure 1:
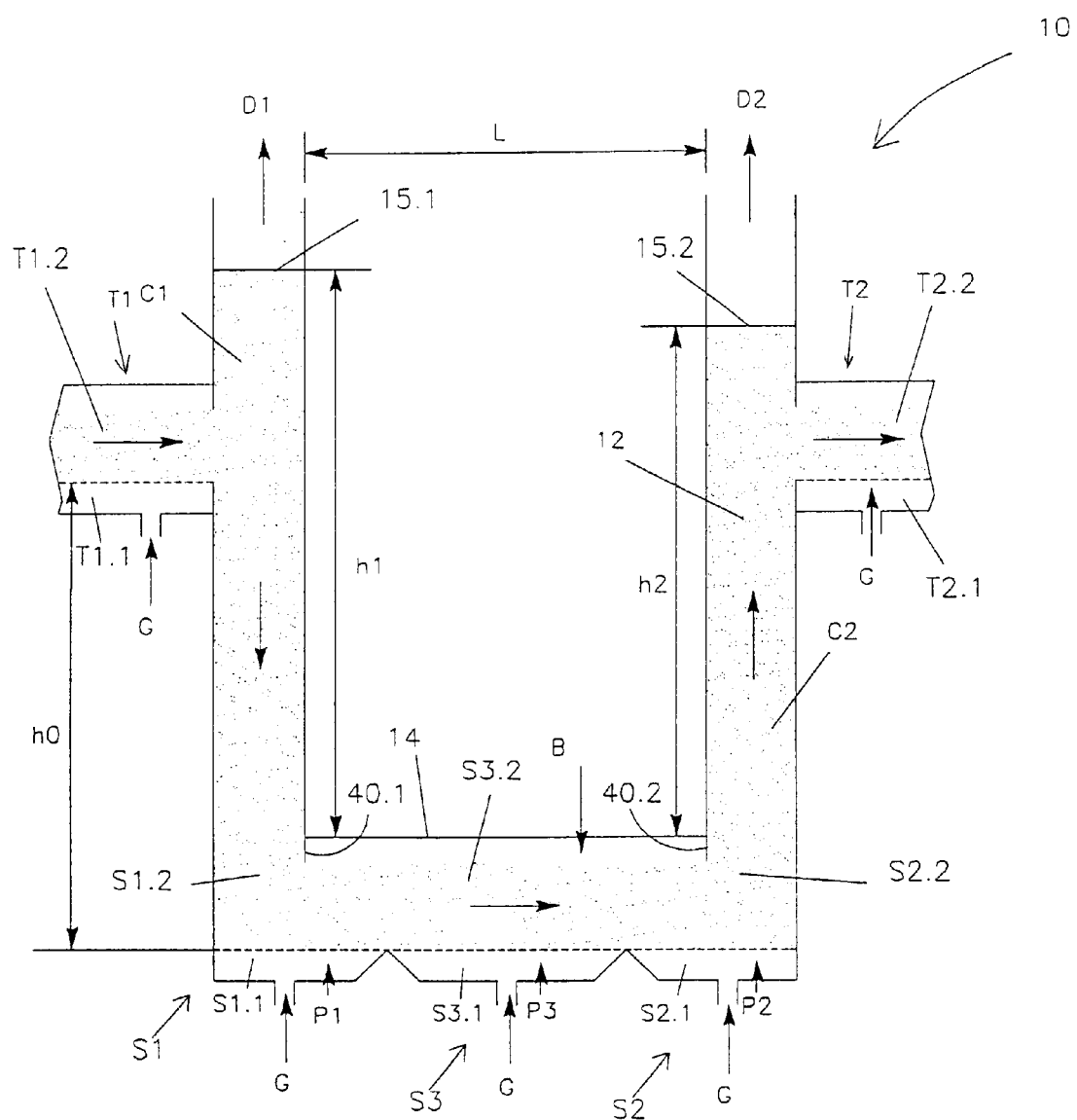
FIG. 1 shows a diagrammatic vertical section through a first device according to the invention, which bypasses an obstacle by going under it.

The Hyperdense Siphon (FIG. 1)

This example is taken from an aluminum plant that is being modernized by adopting a continuous alumina feed system and in which, starting from a silo located above the level of the vats, the alumina conveyor has to be passed under the floor of the vats to leave space to allow electrolysis service vehicles to pass (transport of liquid bath, metal, etc.).

The bypass device is designed and made in accordance with the characteristics of the process according to the invention. In this particular case, the bypass goes under the vat. Although the medium being circulated (alumina+gas) is compressible in this case and the concept of a siphon applies to hydrodynamic flows only, it is impossible to avoid seeing an analogy between the device in this example shown in FIG. 1 and a hydraulic siphon, due to its shape and the function that it fulfills. This is why the applicant has called it "hyperdense siphon".

The applicant has also observed that no solid plug is created with this type of device; the product is kept in a state of fluidization or potential fluidization at all points and free circulation of the product is achieved regardless of the passage through a low point.

The said hyperdense siphon comprises three distinct potential fluidization caissons:

- at the inlet, a caisson S1 comprising a lower duct S1.1 supplied with gas at pressure P1 and an upper "duct" S1.2, consisting essentially of a column C1 connected at one end to the upper duct T1.2 of the upstream conveyor T1 and at the other end to the upper duct S3.2 of the intermediate caisson S3;
- in the middle, at a level which can bypass the obstacle, an intermediate caisson S3 comparable to a horizontal air pipe, in which the lower duct S3.1 is supplied with gas at pressure P3 and in which the upper duct S3.2, connected at its first end to the upper duct S1.2 of the upstream caisson S1, is connected at its second end to the upper duct S2.2 of the downstream caisson S2;
- at the outlet from the device, a downstream caisson S2 comprising a lower duct S2.1 supplied with gas at pressure P2 and an upper "duct" S2.2 consisting essentially of a column C2 connected at one end to the upper duct S3.2 of the intermediate caisson S3 and at the other end to the upper duct T2.2 of the downstream conveyor T2.

The horizontal conveyors T1 and T2 are at the same level in this case, but there is no reason why the upstream conveyor and the downstream conveyor should not be at a different height.

The length L of the intermediate caisson, equal to 20 meters, is sufficient in this case to take the powder material to be conveyed beyond the obstacle. If a greater length L is necessary, it is preferable to connect the caisson S3 with other intermediate caissons S'3, S"3, etc., identical to S3, such that they have a common upper duct and lower ducts supplied with gas at a potential fluidization pressure P'3, P"3, etc.

Column C1 is filled with alumina over a height h1 such that the free level of the said material 15.1 is higher than the highest point of the air pipes T1, T2 and S3. Similarly column C2 is filled with alumina over a height h2 such that the free level of the said material 15.2 is also higher than the highest point of the air pipes T1, T2 and S3. The pressure difference $\Delta P=P1-P2$ is always positive and is achieved when the height of the powder material h1 is kept greater than h2.

The intermediate caisson S3 is lower than the caisson on the two horizontal conveyors T1 and T2; the distance h0 is about 6 meters. Therefore in order to leave free passage for electrolysis service vehicles, it was necessary to pass the alumina 6 meters below the level of the main conveyor over a distance of 20 meters, and then to lift it up by about 6 meters again, due to the vat layout.

The pressures P1 and P2 are adjusted such that the system remains full of alumina at all times. The pressures P1 and P2 are such that:

$$P1=h1*d1$$

and $$P2=h2*d2,$$

where d1 is the average density of the product in potential fluidization in column C1, and d2 is the average density of the product in potential fluidization in column C2. The density of the fluidized product varies from one column to another; it is lower when the fluidization pressure is higher.

The applicant has observed that all that is necessary is to make sure that height h1 is greater than height h2, so that pressure P1 will be greater than P2 and thus the device will operate like a hydraulic siphon; there is a natural flow of alumina despite the low point imposed by the geometry of the device.

The pressures are chosen to be equal to the following values:

P1=0.7 bars–P2=0.6 bars–P3=0.65 bars.

It is then found that the level h1 of the product with medium density 0.85 is about 8.2 meters, whereas h2 is about 7 meters, and the product flows naturally through the hyperdense siphon, going down through column C1, following caisson S3 and rising again through column C2.

In order for this system to work properly, a bubble B of gas was formed in the upper part of the intermediate caisson S3. This gas bubble is obtained conventionally by penetration of columns C1 and C2 into the upper part of the intermediate caisson S3.

Figure 2:
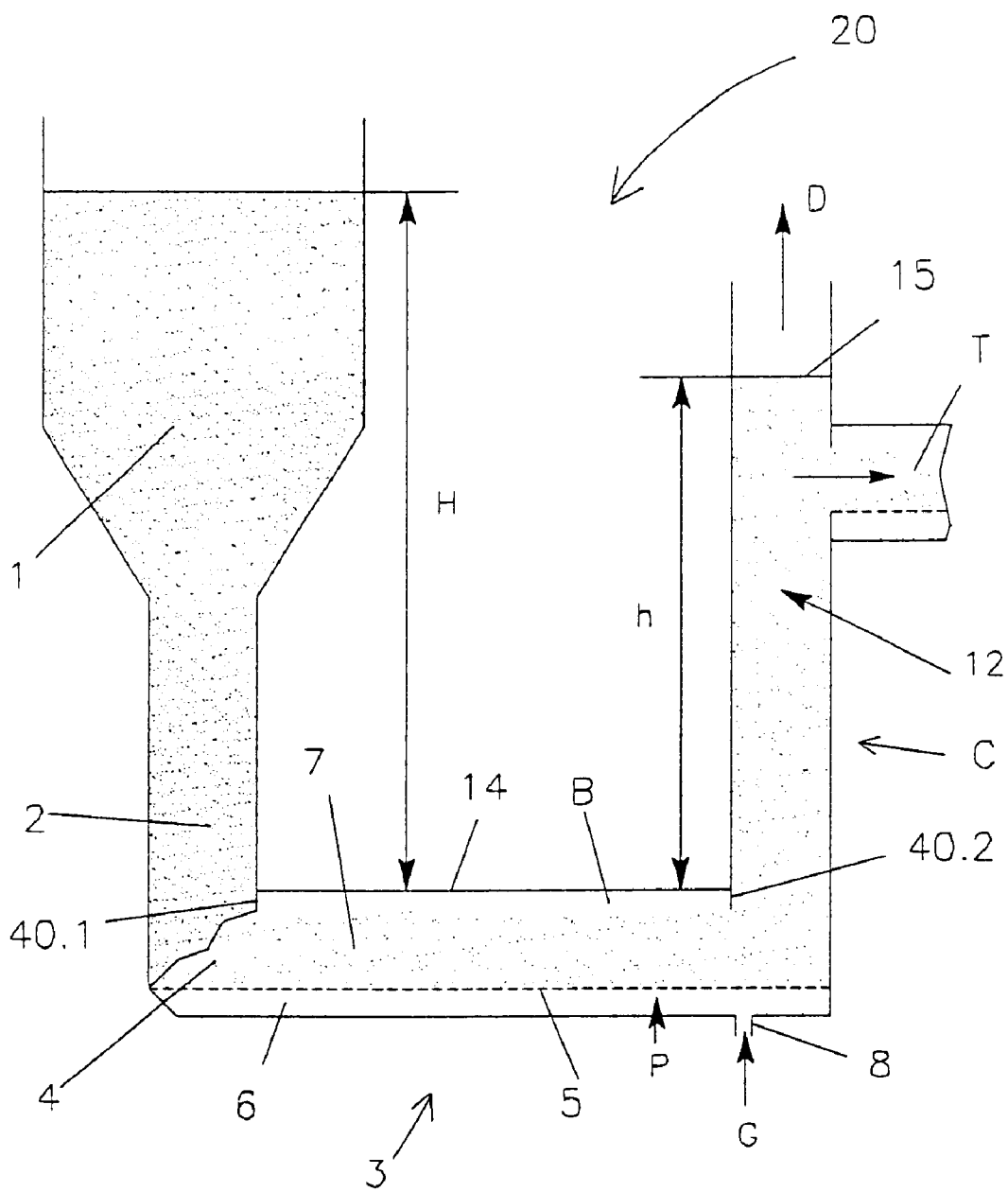
FIG. 2 is a diagrammatic vertical section through a second device according to the invention, used for extraction of powder material from a silo located close to an obstacle.

EXAMPLE 2
Extraction at the Silo Bottom (FIG. 2)

Another application of the siphon in the hyperdense phase is extraction of a powder product from the bottom of a silo.

The silo is not always located very close to the ground. In this case it is necessary to raise the product after it is extracted, for subsequent use at a level higher than the level of the bottom of the silo, for example to feed other conveyor equipment without the need to make a reclaim pit for the product to be conveyed.

FIG. 2 shows the diagram of such a device. Silo 1 feeds the siphon consisting of the bottom 2 of silo 1, the intermediate conveyor 3 and column C. The siphon itself feeds the horizontal conveyor T or any other handling or storage system.

The intermediate conveyor 3 is composed of a lower duct 6 and an upper duct 7, connected at one end to column C, and at the other end to silo 1 through an area 4 at the lower part of bottom 2 of silo 1. A gas G is injected through a tube 8 at a pressure P. This gas passes through the porous wall 5 that separates the lower duct 6 and the upper duct 7.

In this configuration, silo 1 is an overhead storage tank; it is not fluidized. The height H representing the alumina head in silo 1 must be greater than the elevation height h of the product 12. The lower part 4 of the bottom 2 of silo 1 is then in a potential fluidization condition, so that the powder material 12 can flow well through the siphon consisting of bottom 2 of silo 1, the intermediate conveyor 3 and column C.

If the system is to operate properly, it is advantageous to form a space free of powder material in the high part 14 of the upper duct 7 of the intermediate caisson, forming a pressurized gas bubble B. A stable bubble B can be created by extending column C with a penetration 40.1, or by extending bottom 2 of silo 1 with a penetration 40.2.

In this example, the fluidization pressure is such that $P=d*h$, where d is the average density of the solid when in the fluidization state.

It has been shown experimentally that for alumina, it is quite possible to lift the product to a height h equal to 7 m, by imposing an air pressure P of the order of 0.6 bars.

Obviously, these values are not restrictive and the pressure P can be increased in order to raise the product to the required height.

Figure 3:
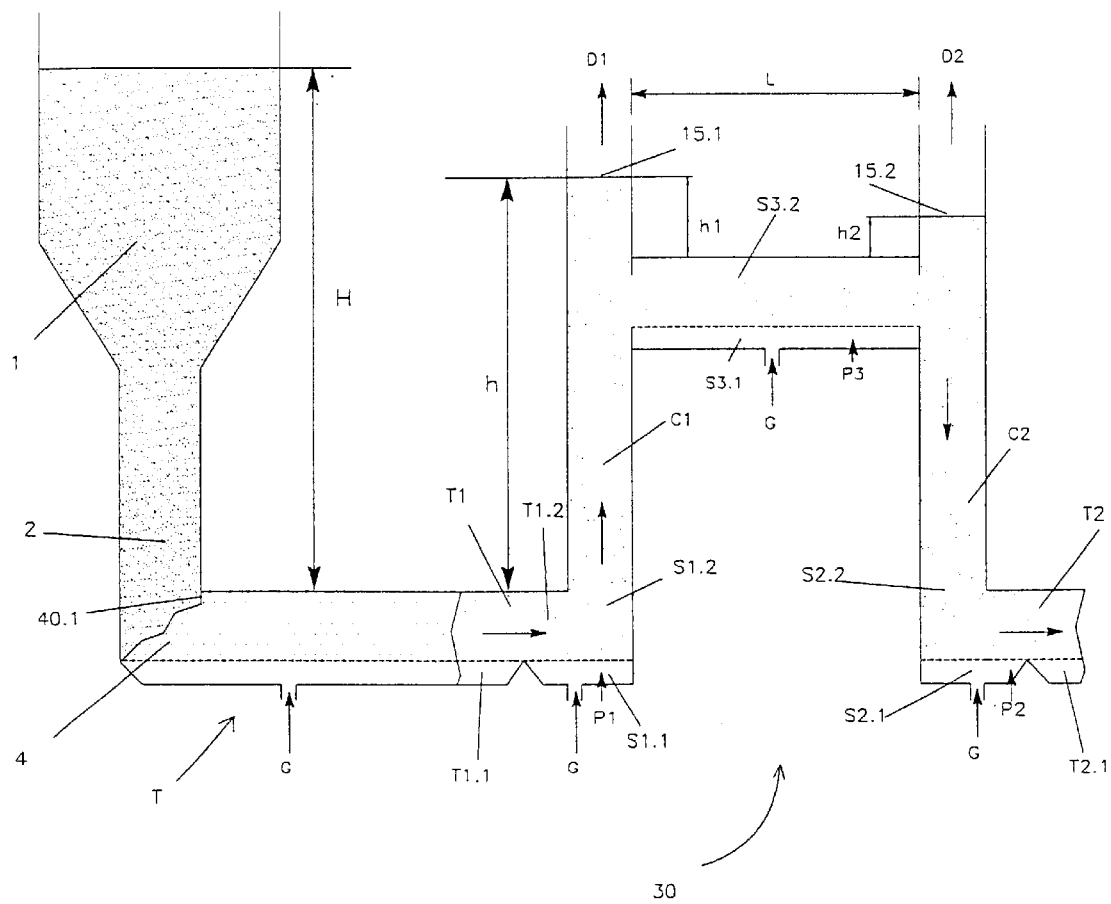
FIG. 3 is a diagrammatic vertical section through a third device according to the invention, which bypasses an obstacle by going over it.

EXAMPLE 3
Bypass Over the Top (FIG. 3)

FIG. 3 illustrates a device used to bypass an obstacle by going over it. The various parts of the device are marked with the same references as those used in the example in FIG. 1 and in FIG. 2.

This type of device cannot operate in isolation. It is connected to the overhead storage tank by means of a set of air pipes represented in FIG. 3 by the air pipe T. As in the example 2, the upper level of alumina in this overhead storage tank 1 is often higher than the free levels of alumina in the columns of the bypass device, and particularly the upstream column (the height H of alumina must then be greater than the height h in column C1).

Advantages of the Process According th the Invevtion

This process is used to design and make hyperdense siphons used:

- to supply electrolysis vats between two horizontal conveyors, passing under or over a free passage;
- or for extraction from a silo when the silo is located close to the ground.

What is claimed is:

1. Bypass device (10, 30) for conveying a powder material in a hyperdense phase and connected to an upstream conveyor (T1) and a downstream conveyor (T2), comprising at least upstream, intermediate and downstream caissons:

the upstream caisson (S1) comprising a lower duct (S1.1) supplied with gas at pressure P1 and an upper duct (T1.2) comprising a column (C1), connected at one end to an upper duct (T1.2) of he upstream conveyor (T1) and at the other end to an upper duct (S3.2) of the intermediate caisson (S3);

at least one said intermediate caisson (S3), having a lower duct (S3.1) supplied with gas at pressure P3 and an upper duct (S3.2) connected at a first end to the upper duct (S1.2) of the upstream caisson (S1), and connected through a second end to an upper duct (S2.2) in the downstream caisson (S2);

the downstream caisson (S2) comprising a lower duct (S2.1) supplied with gas at pressure P2 and an upper duct (S2.2) comprising a column (C2) connected at one end to the upper duct (S3.2) of the intermediate caisson (S3) and at another end to an upper duct (T2.2) of the downstream conveyor (T2).

2. Bypass device (10) according to claim 1, wherein the intermediate caisson (S3) is lower than the upstream conveyor (T1) and the downstream conveyor (T2).

3. Bypass device (30) according to claim 1, wherein the intermediate caisson (S3) is higher than the upstream conveyor (T1) and the downstream conveyor (T2).

4. Bypass device (10, 30) according to claim 1, wherein the column (C1) and the column (C2) are balancing columns filled with powder material over a height (h1, h2) such that a free level (15.1, 15.2) of the material in each of the columns is above the highest point in air pipes selected from the group consisting of the intermediate caisson (S3) and parts of the upstream conveyor (T1) and downstream conveyor (T2) located close to their junctions with the bypass device.

5. Bypass device (10, 30) according to claim 1, wherein the pressure P3 in the intermediate caisson (S3) is intermediate between a potential fluidization pressure P1 in the first column (C1) and a potential fluidization pressure P2 in the second column (C2).

6. Process for conveyance of a powder material in a hyperdense bed to bypass an obstacle, in which an obstacle bypass device (10; 20; 30) comprising at least upstream, intermediate and downstream caissons is inserted between two horizontal conveyors, an upstream conveyor (T1), and a downstream conveyor (T2), comprising the steps of:

at a device entry, at the upstream, caisson (S1) supplying with gas at pressure P1 a lower duct (S1.1), the upstream caisson further comprising an upper duct (S1.2) comprising a column (C1) connected at one end to the upper duct (T1.2) of an upstream conveyor (T1) and at another end to an upper duct (S3.2) in the intermediate caisson (S3);

in said intermediate caisson between said upstream caisson and the downstream caisson at a level that bypasses the obstacle, feeding a lower duct (S3.1) with gas at pressure P3 and connecting an upper duct (S3.1) which is connected through a first end to the upper duct (S1.2) of the upstream caisson (S1), at a second end to an upper duct (S2.2) of the downstream caisson (S2); and at a device outlet, at the downstream caisson (S2) supplying with gas at pressure P2 a lower duct (S2.1), the downstream caisson further comprising an upper duct (S2.2) comprising a column (C2) connected at one end to the upper duct (S3.2) of the intermediate caisson (S3) and at another end to the upper duct (T2.2) of the downstream conveyor (T2);

wherein said caissons remain full of powder material kept in a potential fluidization state at all times, a pressure difference P1–P2 being kept strictly positive.

7. Process according to claim 1, wherein air pipes connect an overhead storage tank (1) to an area to be supplied, and wherein a free level of powder material in the overhead storage tank (1) is higher than a free level of the powder material filling each column (C; C1; C2) of the bypass device (10; 20; 30).

8. Process according to anyone of claim 1, wherein a space without any powder material is created in a high part (14) of the upper duct (S3.2) of the intermediate caisson (S3), forming a pressurized gas bubble (B).

9. Process according to claim 8, wherein the column (C1) of the upstream caisson (S1) and the column (C2) of the downstream caisson (S2) are balancing columns.

10. Process according to claim 9, wherein powder material in column (C1) in the upstream caisson (S1) has a height (h1) which is kept greater than height (h2) of the powder material in the column (C2) in the downstream caisson (S2).

11. Process according to claim 9, wherein the columns (C1) of the upstream caisson and (C2) of the downstream caisson are supplied with powder material over a height (h1, h2) whereby a free level (15.1, 15.2) of the material in each of the said columns (C1, C2) above a highest point of air pipes selected from the group consisting of the intermediate caisson (S3) and parts of the upstream conveyor (T1) and the downstream conveyor (T2) located adjacent to their junctions with the bypass device (10; 20; 30).

* * * * *